United States Patent [19]
Doshi

[11] Patent Number: 4,599,892
[45] Date of Patent: Jul. 15, 1986

[54] VOLUME MEASURING APPARATUS

[76] Inventor: Navin H. Doshi, 6418 Springpark Ave., Los Angeles, Calif. 90056

[21] Appl. No.: 677,880

[22] Filed: Dec. 4, 1984

[51] Int. Cl.⁴ ............................................. G01F 17/00
[52] U.S. Cl. ...................................... 73/49.2; 73/149; 73/290 B
[58] Field of Search ................. 73/149, 290 B, 290 V, 73/702, 49.2; 367/908

[56] References Cited
U.S. PATENT DOCUMENTS

| | | | |
|---|---|---|---|
| 3,237,451 | 3/1966 | Haeff | 73/149 |
| 3,596,510 | 8/1971 | Paine | 73/149 |
| 4,383,443 | 5/1983 | Langdon | 73/290 V |

Primary Examiner—Jerry W. Myracle
Attorney, Agent, or Firm—Herzig & Yanny

[57] ABSTRACT

The apparatus consists of a mechanical acoustical driver producing sound vibrations in a fluid, such as a liquid or gas, within an enclosed space. A pickup transducer positioned within the tank measures the sound vibrations of the gas within the tank and transmits the same to a lock-in amplifier and a low pass filter. The outputs of the lock-in amplifier and low pass filters are fed to differential amplifiers which amplify the difference between the dynamic fluid pressure changes caused by the sound vibrations and the static pressure. An acoustical resistor is positioned between the pickup transducer and the wall of the enclosed space for providing a fluid passage way therethrough. The acoustic resistor in conjunction with a nonlinear circuit element mounted at the output of the differential amplifiers linearizes the output of the apparatus providing accurate measurements of the material at both extremes of either very small volume or very large volume in the enclosed space.

Another embodiment of the invention incorporates a container for a fluid and a pickup transducer positioned therein. An acoustical driver produces sound waves therein which are measured by the pickup transducer and transmitted to a preamplifier and from there to a spectrum analyzer. In place of a spectrum analyzer, a fast fourier transform machine may be substituted. The spectrum analyzer or fast fourier machine detects amplitude changes caused by a fluid leak in the enclosed space.

26 Claims, 13 Drawing Figures

VOLUME MEASURING APPARATUS

BACKGROUND OF THE INVENTION

1. Field of the Invention

The invention relates generally to an apparatus for measuring the volume of an incompressible material confined within a space, and more particularly to an apparatus using an acoustical method for making such a measurement.

2. Description of the Prior Art

Various methods for measuring the amount of liquid in a storage space are currently being used. Probably the most common of these methods is an apparatus which incorporates a float designed to rest on the surface of the liquid in a tank or chamber. The position of the float (through electrical or mechanical means) is used to ascertain the total volume of the liquid in the chamber. One disadvantage with this type of apparatus is the instability of the float level resulting from movement of the tank which may be within a motorized vehicle. Movement of the tank causes the mass of liquid within to move to one side (and up one side) of the tank upon acceleration or deceleration of the vehicle. Consequently, movement of the tank results in a change in the level of the liquid at various locations within the tank, thereby altering the position of the float without a change in liquid volume. Thus, this type of prior art apparatus may require a damping or averaging meter to compensate for the effects of movement of the tank.

In a device where the level of the liquid is used to determine the volume, the correlation between the level of the liquid and volume of the liquid must be ascertained in order to provide such a measurement. The float position range must then be calibrated in order to provide an precise measurement of the volume of the liquid. However, even accurate calibration may not overcome the inaccuracies inherent in this form of of measuring device. If the float is at one side of the tank, the liquid may have a meniscus of which may prevent accurate measurement of the liquid level. This meniscus can also vary according to the type of liquid or the purity of the liquid contained in the tank. Moreover, different types of liquids typically have their different surface curvatures caused by different surface tensions. Thus, accuracy of the surface level measurement of such liquids depends to a large extent on its surface curvature and on where the float measurement is made. Thus, a different reading will be obtained depending on whether the float is positioned at the center of the liquid surface or at the edge near the side of the tank.

For measurement of a solid or a powdered substance, volumetric measurements can involve even greater difficulties. Clearly, a powdered or granular solid does not ordinarily have a level surface—particularly if this material is constantly being depleted from the tank or added to the tank. Thus, a float system of measurement is impractical with solids.

Measurements of the volume of solids and liquids having large surface irregularities have been accomplished in the prior art by ascertainment of the specific weight of the liquid or solid to be measured and the ascertainment of the weight of the chamber. The weight of the entire chamber and material contained therein is then weighed and related to the specific weight of the material in order to arrive at the volume of the material. The accuracy of this method depends to a large extent on the consistency of the specific weight value of the material and the accuracy of the weight measurement of the tank. In this regard, it must be noted that the specific weight of a material may vary substantially according to the temperature of the material. Moreover, it is not always practical to obtain an accurate weight measurement of some types of tanks. The location of such tanks may make weighing infeasible, or the tanks may be rigidly secured to another fixture. The inherent inaccuracies of float type of measurement system becomes even more acute when in a zero gravity environment such as in open space. In zero gravity environment, the shape of a liquid and a solid may be constantly changing. Pockets of liquid and gas may be interspersed throughout the storage chamber thereby preventing any accurate measurement of the surface level.

It must also be noted that in a zero gravity and zero acceleration environment, the surface level and shape of the liquid is determined by a variety of factors. Thus, a determination of the shape of the liquid and its position may be very difficult. Thus, the complexity of ascertaining the shape and location of the liquid may make prior art volume measuring devices unreliable as well as impractical.

Other prior art devices for measuring the volume of a liquid in a tank include various sensors for ascertaining the location of the surface level of the liquid. In one such prior art device, an acoustic signal is reflected from the surface of the liquid to a receiving sensor. Measurement of the time it takes to arrive at the receiving sensor makes possible a measurement of the location of the surface level of the liquid. However, as pointed out hereinabove, meniscus of the liquids, their surface curvature variations and movement of the liquid are also pertinent with this prior art system as well. Consequently, this of the float type measurement described hereinabove. method of measurement has most, if not all, of the disadvantages Another prior art system for measuring the volume of a noncompressible liquid or solid in tank uses an acoustical means to measure the pressure of a fixed volume of gas in the tank. The pressure is inversely proportional to the gas volume for a constant quantity of gas at a constant temperature. Consequently, a measurement of the gas pressure will indirectly be a measurement of the gas volume. Moreover, a pressure change cause by a change in volume caused by the acoustic diaphragm is proportional to the volume of the gas in the tank. In a storage tank of a fixed and invariable size deducting the gas volume from the total volume of the tank will result in a measurement of the liquid or solid volume in the tank.

One prior art device uses an acoustic speaker and two transducers to measure the pressure changes of the gas. One transducer is situated within the chamber containing the material to be measured and the gas, and the other transducer is situated in a reference cavity which contains only the gas. Use of the reference cavity tends to neutralize any static pressure, as per PV/T=Gas Const; this is any variation not caused by the movement of the speaker; thus, the reference cavity tends to compensate for pressure variations due to temperature variations, mixture of another gas within the chamber static pressure changes, etc. The reference cavity is connected to the chamber by means of a small passage way. However, an obvious disadvantage of this prior art system is that a liquid to be measured within the chamber may also leak into the gage and/or reference cavity thereby altering the total volume of the material in the chamber, changing and introducing inaccuracies into the measurement. Pressure changes result from acoustic vibrations in the gas accomplished by means of the speaker diaphragm which is driven also by a transducer.

However, a primary disadvantage with this prior art system incorporating an acoustic speaker is its susceptibility to diaphragm distortion caused by splashing of the liquid within the chamber. The liquid may soak into the diaphragm causing distortion in the diaphragm's frequency of vibration. In addition, the liquid may also splash onto the diaphragm thereby adding to its weight and also consequently adding to the load onto the electromagnetic driver for the speaker; since the amplitude of vibration of the diaphragm is load-dependent, the added weight of the liquid on the diaphragm causes an undesirable alteration in the volume change (and concomitant pressure change) of the gas produced by the vibrating diaphragm. This alteration in amplitude introduces an inaccuracy in the measurement of the material volume. The liquid may also distort the shape of the diaphragm thereby making the reference cavity volume not a constant; since this prior art system bases its volume measurement on the equation:

$$\frac{V_T}{V_R} = k \frac{\Delta P_R}{\Delta P_T};$$

where k=a constant a lack of a known constant value of $V_R$ reduces the accuracy of this measurement.

It must also be pointed out that since the acoustic speaker is operated at its resonant frequency, the liquid on the diaphragm will also alter $\Delta P$ (and $\Delta V$).

The use of an acoustic speaker makes the system very sensitive and fragile; since the speaker is driven at resonant frequency, the liquid contamination and mechanical and/or acoustic vibration could make the system grossly inaccurate since the speaker must be responsive to only one sonic frequency of vibration.

The diaphragm is mounted between the reference cavity in the chamber so that displacement of the diaphragm results in a corresponding change in volume of the reference cavity as well as a change in volume of the chamber. Vibration and noise interferences are eliminated by means of a suitable pass band filter. The operating frequency of the diaphragm is preferably less than the resonance frequency of the liquid gas mixture.

It must also be noted that operating this prior art system at its resonant frequency renders the amplitude of the response to the driver frequency and/or driver energy nonlinear i.e. at resonance small incremental changes in energy input to the speaker result in disproportionately large increases in the amplitude of vibration of the speaker and consequently the change in pressure and volume of the gas. Thus, the nonlinear response of the speaker introduces gross inaccuracies in the measurement.

A disadvantage with such prior art acoustic measurement systems is the difficulty of obtaining a stable frequency of vibration of the diaphragm. A wide range of sound frequencies emitted therefrom introduces inaccuracies in the final measurements. Indeed, vibration of the diaphragm may induce vibrations in other parts of the system. Moreover, vibration problems are not completely eliminated by the pass band filters. Instead, vibration problems are extant and are likely to introduce error in the final measurement.

One of the primary disadvantages is that the reference cavity requires a passage way connecting it to the chamber; this passageway is not large enough to quickly equalize static gas pressures between the chamber and the cavity. However, enlargement of the passage way introduces leakage of liquid and/or solids into the passageway and therefore from the chamber into the cavity. Both of these occurrences introduce various inaccuracies in the measurement. It is also pertinent to note that gas diffusion from the chamber to the reference cavity or vice versa typically takes an inordinately long period of time. A primary disadvantage of this prior art acoustic measuring system is that theoretically, as the tank fills the pressure signal approaches infinity whereas the volume of the material to be measured merely approaches a certain maximum value. Conversely, as the tank approaches empties, the pressure signal approaches a certain value nonlinearily. Thus, the relationship between the tank volume and the pressure signal is a curve rather than a straight line. This nonlinear aspect of the system introduces gross inaccuracies and difficulties in measurement when the tank is either close to empty or close to full. Moreover, the complexity of the system introduces many ways in which the system may break down or compromise accuracy.

SUMMARY OF THE INVENTION

The present invention provides a simple apparatus for acoustically measuring a volume of liquid or solid within an enclosed chamber.

Another aspect of the present invention incorporates an improved acoustic driver which provides a constant amplitude independent of frequency response to energy input.

Another aspect of the present invention incorporates an improved acoustic driver in the apparatus which is impervious to frequency and amplitude response alteration due to contact with liquid in the chamber or cavity of the apparatus.

Another aspect of the present invention incorporates an improved acoustic driver in the apparatus which is substantially vibration free.

Another aspect of the present invention provides an apparatus for acoustically measuring volume of a liquid or solid in a chamber to a high degree of accuracy.

Another aspect of the present invention provides an acoustical volume measuring apparatus which has a linear output from zero volume of material to be measured to maximum volume of the material to be measured within the tank.

Another aspect of the present invention provides an apparatus for acoustically detecting leakage of a gas, liquid, or solid from an enclosed space.

The present invention thus provides for a very simple apparatus for using acoustics to measure the volume of a solid or liquid within a chamber. One embodiment of the invention uses only one transducer to pick up the sound vibrations within the chamber. The acoustical driver is operated at very low frequencies in order to neutralize the effects of heat, and contamination of the gas on the acoustical measurements. At low frequencies, the effect of the specific heat on the pressure change relationship to volume change is minimized.

The present invention uses a lock-in amplifier to selectively amplify a signal within a very narrow band width. The lock in amplifier is precise in rejecting unwanted signals caused by vibration or noise and eliminate the need for a pass band filter. The use of a lock-in amplifier thus enables a more accurate measurement of the volume of the material.

Another important feature of the present invention is the addition of an acoustic resistor and nonlinear circuit element which enables the linearization of the acoustic output in relation to the pressure of the fluid, such as a liquid or gas. Thus, the addition of these elements changes the acoustic response in relation to the pressure which is ordinarily a curve into an approximately straight line. However, in place of the acoustic resistor and nonlinear circuit element, a logarithmic amplifier may also be used. The logarithmic amplifier converts the exponential relationship between pressure change and volume change into a linear relationship. This eliminates inaccuracies both at points at where the tank is approximately empty and where the tank is approximately full.

In summary, the present invention provides for a very accurate and reliable apparatus for acoustically measuring the volume of a material within the chamber. Moreover, the accuracy is maintained at both extremes of the volumetric measurements.

BRIEF DESCRIPTION OF THE DRAWINGS

A better understanding of the present invention may be had from a consideration of the following detailed description taken in conjunction with the accompanying drawings in which:

FIG. 6 is a diagrammatic illustration of the acoustical drivers of FIG. 1, 3, 5, 7, 8, wherein:

FIG. 6 (a) is a diagrammatic cross-sectional illustration of a mechanical acoustical driver without a diaphragm;

FIG. 6 (b) is a diagrammatic cross-sectional illustration of a mechanical acoustical driver with a diaphragm;

FIG. 6 (c) is a diagrammatic cross-sectional illustration of a mechanical acoustical driver with double bellows;

FIG. 6 (d) is a diagrammatic cross-sectional illustration of a pneumatic acoustical driver with double bellows;

FIG. 6 (e) is a diagrammatic cross-sectional illustration of a pneumatic acoustical driver with a diaphragm;

FIG. 6 (f) is a diagrammatic cross-sectional illustration of an electrodynamic accoustical driver;

DETAILED DESCRIPTION OF THE PREFERRED EMBODIMENT

Figure 1:
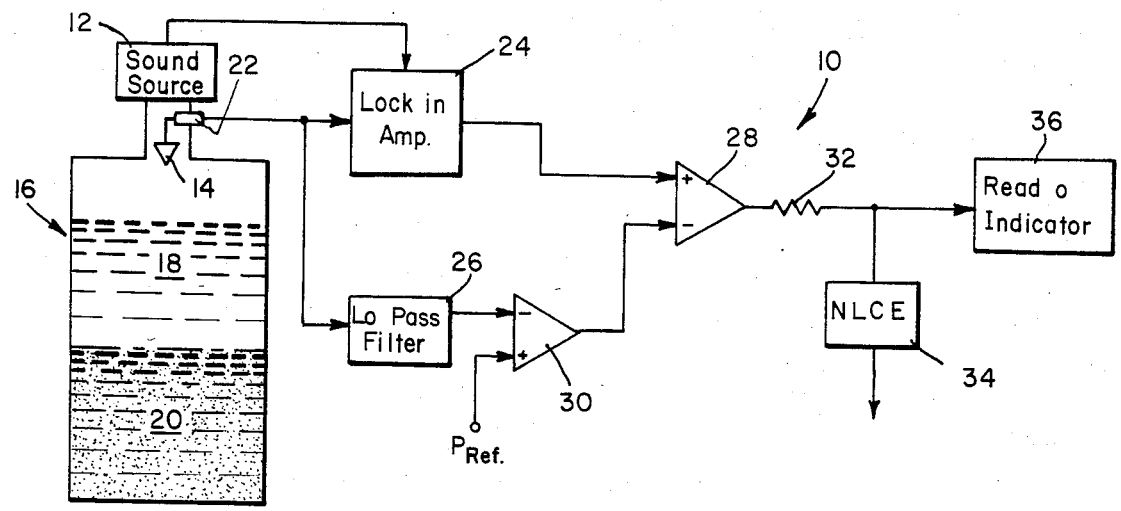
FIG. 1 is a diagrammatic illustration of one preferred embodiment of the invention including a schematic diagram of the electrical circuitry.

Referring now to the drawings, there is shown a preferred embodiment of the invention generally designated by the numeral 10 according to the present invention. The apparatus 10 consists of both mechanical and electrical components. The apparatus is illustrated in diagrammatic form for simplicity and clarity. A sound source or acoustic driver 12, which may be any one of the acoustical drivers depicted in FIG. 6, emits sound into an enclosure 16. The enclosure 16 has a portion, designated as 18, containing the fluid, such as a liquid or gas; and also a portion, designated as 20, containing a liquid or solid, the volume of which is to be measured. There is preferably no partition between the portions 18 and 20. A pickup transducer 14 is appropriately positioned in the portion 18 of the enclosure 16 containing the fluid, such as a liquid or gas; portion 18 is also referred to as the ullage volume portion 18 of the enclosure 16. The transducer 14 may be merely a microphone or other suitable device for changing mechanical energy of the sound waves of the sound source or acoustic driver 12 into electrical energy. An acoustical resistor 22 is connected between the transducer 14 and the enclosure 16. The acoustical resistor 22 is preferably merely a tube providing a connection between the outside and inside of the enclosure 16. The embodiment of FIG. 1 is provided with the acoustical resistor 22 where there are no significant changes in static fluid pressure and fluid mixtures in the ullage volume 18 of the enclosure 16.

A lock-in amplifier 24 is connected to the electrical output of the transducer 14. The lock-in amplifier 24 has a fixed gain and the output of the lock-in amplifier 24 is in turn connected to a differential amplifier 28. The output of the transducer 14 is also channeled to a low pass filter 26. The low pass filter filters out all of the signal above a certain desired value whereas the lock-in amplifier only allows a signal in a very narrow band width. Thus, the low pass filter 26 processes a signal which is lower in frequency than that processed by lock-in amplifier 24. Consequently, the low pass filter processes static pressure changes which are typically slower than the pressure changes caused by the sound source or acoustic driver 12 and therefore have a lower frequency. The output of the low pass filter 26 is transmitted to differential amplifier 30. The other input terminal of differential amplifier 30 receives from a desired reference pressure output. The output of differential amplifier 30 is fed into the input of differential amplifier 28, the output of which is communicated to resistor 32. The output from resistor 32 is bifurcated into a nonlinear circuit element and an ordinary direct readout which may be digital or mechanical. The readout 36 produces a response curve whereas the output from the nonlinear circuit element 34 produces an output which is linear.

Figure 2:
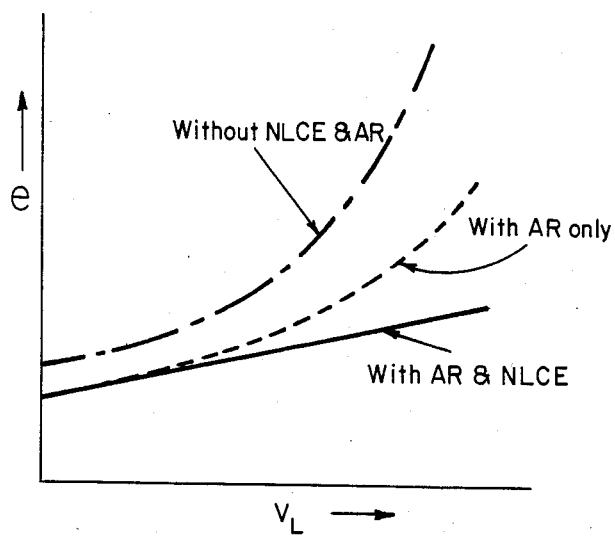
FIG. 2 is a graphical illustration of the response of the embodiment of FIG. 1.

FIG. 2 shows the response of the embodiment of FIG. 1: 1) without the nonlinear circuit element and the acoustic resistor; 2) with the acoustic resistor; 3) with the acoustic resistor and nonlinear circuit element combined. It can be seen through FIG. 2 that the acoustic resistor and nonlinear circuit element provide a response which is a substantially straight line. Consequently, the response of the embodiment of FIG. 1 with the acoustic resistor and nonlinear circuit element enables a measurement to be made when the tank is both nearly empty and nearly full. This provides an apparatus which is capable of accurately measuring the volume at both ends of the scale.

Figure 3:
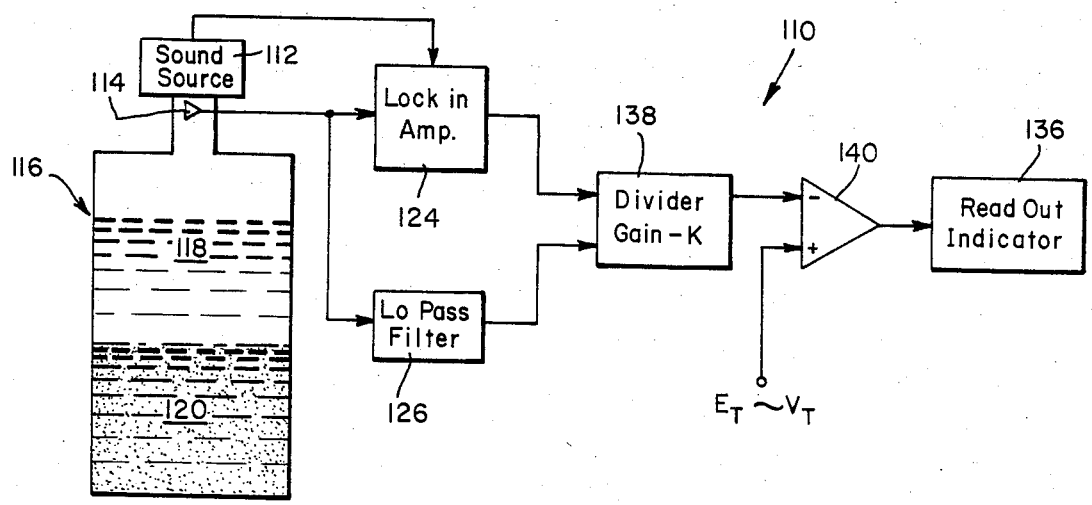
FIG. 3 is a diagrammatic illustration of another embodiment of the invention showing a schematic of the electrical circuitry.

The embodiment of FIG. 3 is similar to that of FIG. 1 except that the outputs of the low pass filter 126 and lock-in amplifier 124 are fed to a divider 138. The divider 138 expresses the outputs from the lock-in amplifier and low pass filter in terms of a ratio. The numerator of this ratio is the output from the low pass filter 126 which is essentially a measurement of the slowly varying static pressures within the enclosure 116; the denominator is the output from the lock-in amplifier 124 which is a measurement of the dynamic pressure changes produced by the sound source or acoustical driver 112, which may be any one of the acoustical drivers depicted in FIG. 6. Since the volume of the mass to be measured is inversely proportional to the dynamic pressure of the fluid in the ullage volume 118 of the enclosure 116, the output of the divider 138 provides the ratio:

$$\frac{P}{\Delta P} = \frac{V_u}{\gamma V} ; \text{ and}$$

$$\frac{P}{\Delta P} = kV_u = E_u \text{ (divider output)}$$

The output of the divider 138 is fed into the differential amplifier 140 which also receives input $E_T$ which is a desired signal which is proportional to the total volume of enclosure 116 (i.e. a calibration signal).

The same transducer 114 can measure both dynamic pressure variations and static variations and feed the same to one divider circuit. The output of the differential amplifier 140 is fed into a direct readout indicator 136.

Figure 4:
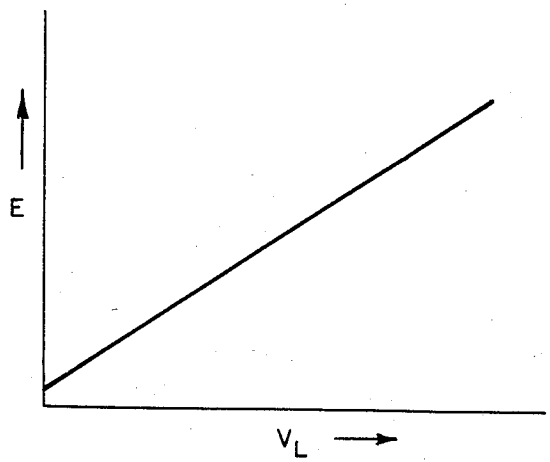
FIG. 4 is a graphical illustration of the response of the embodiment of the invention of FIG. 3.

FIG. 4 show the output of system in FIG. 3 plotted against the volume of the liquid of solid to be measured. As is desirable, the graphical representation shows a linear response.

Figure 5:
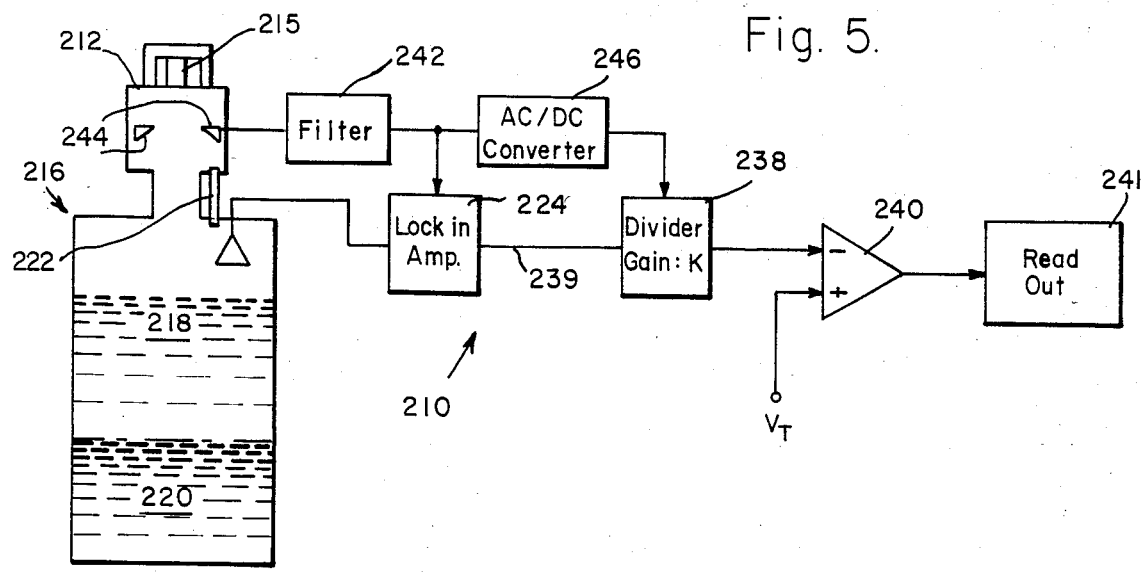
FIG. 5 is a diagrammatic illustration of another embodiment of the invention having one of the acoustical drivers depicted in FIG. 6.

FIG. 5 shows a volume measuring apparatus which may be any one of the acoustical drivers depicted in FIG. 6.

In FIG. 5 a transducer 214 changes the acoustical vibrations in the enclosure 216 to electrical energy and communicates the electrical output to a lock-in amplifier 224 which in turn communicates its output to a divider 238. The communication means are preferably just ordinary electrical wiring generally designated as 239. Where the acoustical driver 212 used is one which contains one or two reference cavities a pick up transducer 244 may be positioned in one or both reference cavities to detect acoustical vibrations in each respective reference cavity. Pressure switches 215 may be installed adjacent to the passage way to the reference cavity so as to equalize pressure and specific heat ratio much more quickly. An acoustic resistor 222, preferably merely a tube, provides a connection between the fluid in the ullage volume 218 and each reference cavity. The pick up transducer 244 in each respective reference cavity communicates the output to an electrical filter 242. The output from filter 242 is communicated to the divider 238, first passing through an AC/DC converter 246. The output of the divider 238 provides a ratio in which the output of the reference transducer 244 is the numerator and the output of the ullage volume transducer 214 is the denominator. Due to the following relationship the resultant output is devoid of any indication of static fluid pressure variations:

$$\text{(Transducer 214) } \Delta P_T = \frac{\text{const}}{V_T} P_T \quad (1)$$

$$\text{(Pick-up transducer 244) } \Delta P_R = \frac{\text{const}}{V_R} P_R \quad (2)$$

Since AR 222 makes $P_T = P_R$     (3)

$$E_U = \frac{\Delta P_R}{\Delta P_T} = \frac{V_T}{V_R} = \text{const } V_T \quad (4)$$

For zero fluid condition ullage volume = $V_T$   (5)

$E_O = E_T - E_U =$ Liquid Volume

The output of the divider 238 is communicated into a differential amplifier 240. The other input of the differential amplifier 240 receives the court signed $E_T$ proportional to the total volume of the enclosure 216. The output of the differential amplifier 240 is thus proportional to the difference between the enclosure volume and the ullage volume. The output of amplifier 240 is communicated to an indicator 241 in an appropriate digital or mechanical readout form as desired. The output thus is a direct readout of the volume of the material to be measured 220.

FIG. 6 contains several embodiments of the acoustic driver or sound source, each of which may be used in the apparatus as described in FIGS. 1, 3, 5 and 8.

Figure 6A:
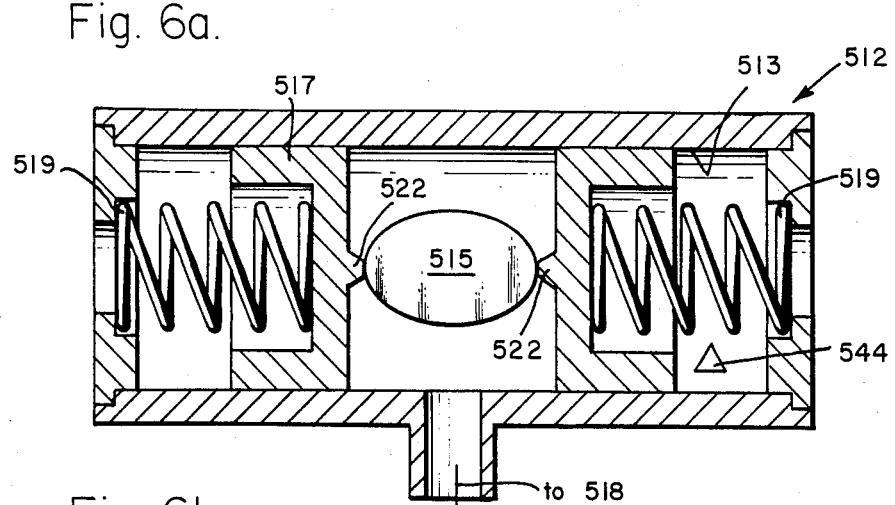
Figure 6B:
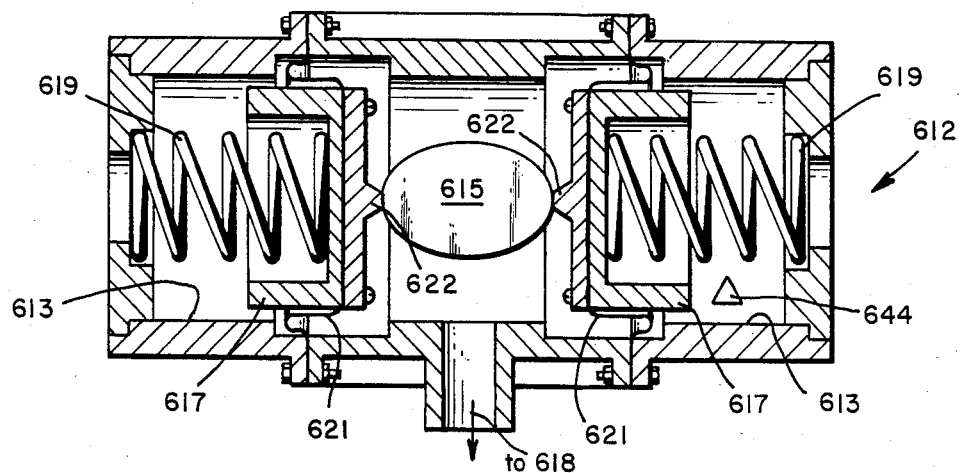
Figure 6C:
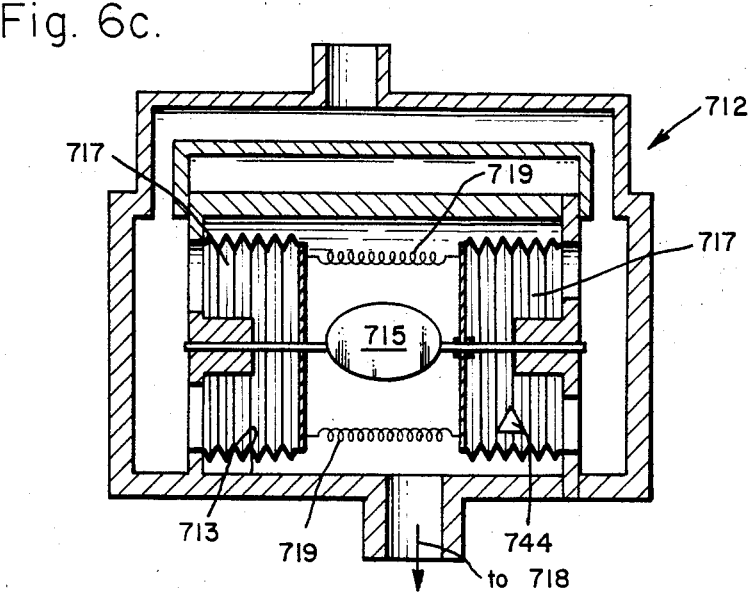

The mechanical acoustical drivers of FIGS. 6(a) and 6(b) are similar except that the mechanical acoustical driver of FIG. 6(b) contains a diaphragm 621 which seals off each reference cavity 613 from the ullage volume chamber 618. As shown in FIG. 6(a), however, the mechanical acoustical driver 512 is adequately functional without the diaphragm. Consequently, a detailed description of the mechanical acoustical driver of FIG. 6(b) equals a description of the mechanical acoustical driver of FIG. 6(a) minus the diaphragm.

The mechanical acoustical driver of FIG. 6(a) and 6(b) have two reference cavities 513 and 613 respectively which enable the passage of the ullage volume liquid, 518 in FIG. 6(a) and 618 in FIG. 6(b) between these reference cavities and the enclosure containing the ullage volume fluid and the material whose volume is to be measurered. A prefereably motor driven cam 515 in FIG. 6(a) and 615 in FIG. 6(b), makes contact with preferably two pistons 617. Which produce volume metric displacements in each reference cavity 613 that are naturally, substantially 180° out of phase with the volumetric displacements produced in the enclosure containing the ullage volume fluid and the material whose volume is to be measurered.

A diaphragm 621 positioned along each piston 617 provides a subsantially frictionless seal and seals off each reference cavity 613 from the ullage volume chamber fluid. Springs 519 in FIG. 6(a) and 619 in FIG. 6(b), bias each piston 517 in FIG. 6(a) and 617 in FIG. 6(b), and accompanying diaphragm 621 in order to provide a faster and more positive action. However, other suitable biasing means may also be used.

Cam lobes 522 in FIG. 6(a) and 622 in FIG. 6(b) are positioned preferably at opposite ends of the motor driven cam 515 in FIG. 6(a) and 622 in FIG. 6(b), in order to substantially eliminate backlash, thereby moving the piston 517 in FIG. 6(a) and 617 in FIG. 6(b), axially outward approximately simultaneously. The substantially simultaneous movement of the pistons, 517 in FIG. 6(a) and 617 in FIG. 6(b), significantly reduces undesired noise and vibration caused by the driver 512 in FIG. 6(a) and 612 in FIG. 6(b). Moreover, the undesired noise and vibration may be further reduced by coating the pistons, 517 in FIG. 6(a) and 617 in FIG. 6(b), with teflon or other suitable material.

Consequently, the mechanical acoustical driver, 512 in FIG. 6(a) and 612 in FIG. 6(b), is virtually unaffected by liquids and has a precisely controlled amplitude and frequency of response. Its response to frequency input is linear; a response which is optimal for acurate measurement of the volume of the material to be measured. Additionally, the mechanical acoustical driver can produce a signal which provides a constant amplitude independent of frequency response to energy input into the acoustic driver.

Also, a pickup transducer, 544 in FIG. 6(a) and 644 in FIG. 6(b), may be positioned in each reference cavity for measuring pressure changes in the fluid which has entered each reference cavity.

FIG. 6 (c) constitutes another embodiment of a mechanical acoustical driver 712. It has preferably two reference cavities, each designated as 713, which enable the passage of the liquid between these reference cavities and the enclosure containing the ullage volume 718 and the material whose volume is to be measured. These cavities also have the same function and volumetric displacement effects as each of the reference cavities depicted in FIGS. 6(a) and 6(b).

A motor driven cam 715 actuates preferably two diametrically opposed bellows 717 which are biased preferably by tension or compression springs 719 so as to provide a faster and more positive action. However, other suitable biasing means may also be used.

Both bellows 717 move axially outward at approximately the same time, produce minimal friction during their operation, and act as a substantially frictionless seal in the manner similar to the diaphragms depicted in FIGS. 6(a) and 6(b). Also, a pickup transducer 744 may be positioned in each reference cavity for measuring pressure changes in the fluid which has entered each reference cavity 713.

As with the drivers in FIGS. 6(a) and 6(b), the mechanical acoustical driver 712 is virtually unaffected by liquids and has an amplitude and frequency of response which may be precisely controlled. Its response to frequency input is also linear; the optimum response for accurate measurement of the volume of the material to be measured. Additionally, the acoustic driver can produce a signal which provides a constant amplitude independent of frequency response to energy input into the mechanical acoustical driver.

Figure 6D:
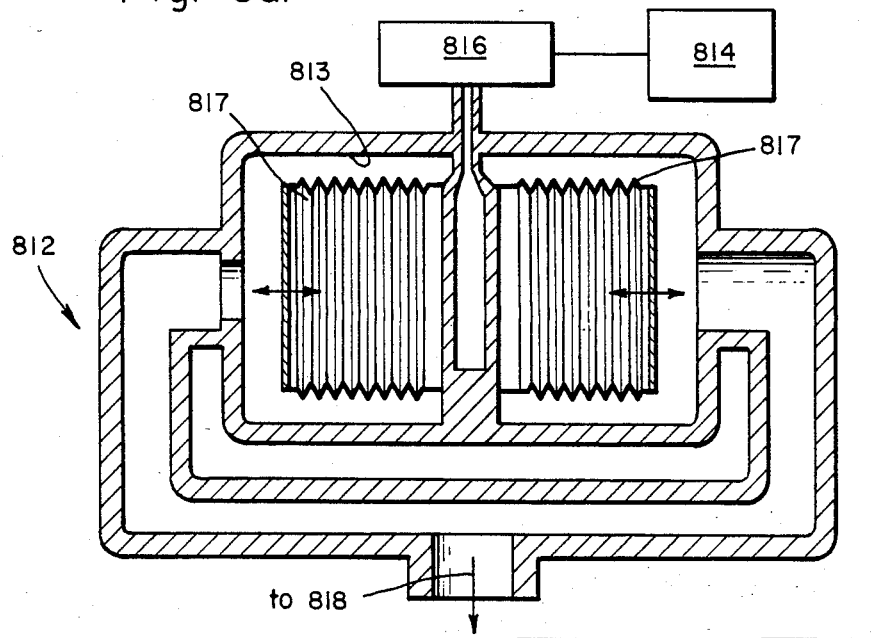
Figure 6E:
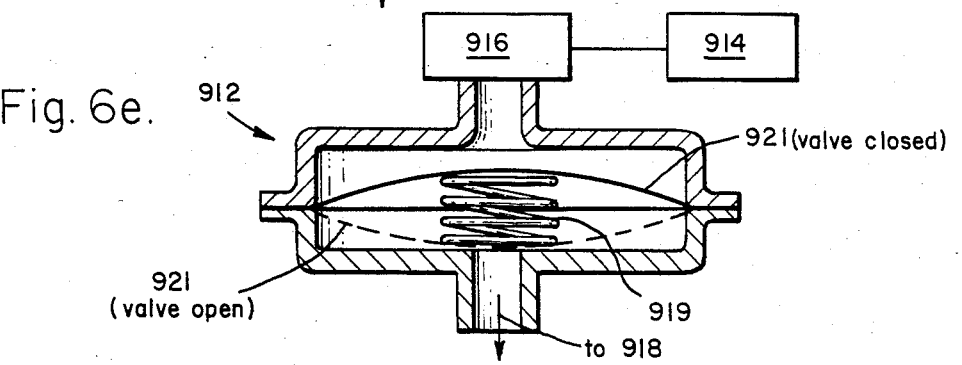

FIG. 6(d) depicts a pneumatic acoustical driver 812 with double bellows 817. It may also have two reference cavities, each designated as 813, which enable the passage of the liquid between these reference cavities and the enclosure containing the ullage volume 818 and the material whose volume is to be measured. Here, a pneumatic device actuates the double bellows by transferring high pressure fluid from an enclosure or tank 814 into the double bellows 817; thereby producing in them substantial simultaneous axially outward and retractive movement. The double bellows 817 operate without producing substantial friction. The above pneumatic device comprises a high pressure fluid tank 814, an electric pressure or solenoid or piezoelectric valve 816 operated at preferably infrasonic frequency, and passageways for transferring the above fluid to the above valve 816 and from the valve 816 to the double bellows 817. FIG. 6(e) depicts a pneumatic acoustical driver 912 with a diaphragm 921. Here, a pneumatic device actuates a diaphragm 921. A spring 919 biases the diaphragm 921, thereby facilitating substantially uniform expansion and contraction of the diaphragm 921.

As in FIG. 6(d) the pneumatic device comprises a high pressure fluid tank 914, an electric pressure or solenoid or piezoelectric valve operated at preferably infrasonic frequency, and passageways for transferring the fluid to the above valve and thereon to the diaphragm. The pneumatic device further operates similarly to that depicted in FIG. 6(d).

Figure 6F:
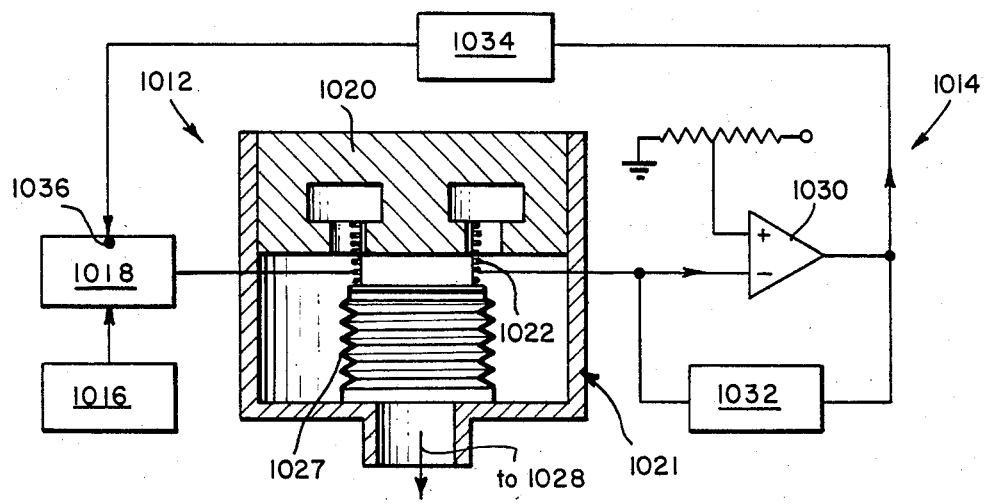

FIG. 6(f) depicts an electrodynamic acoustical driver 1012. This driver comprises a closed loop system; and includes a power amplifier 1018 and a signal amplifier 1030 which electronically operate on the electrodyamic core 1019 so as to produce a relatively constant volumetric displacement of the bellows 1027.

More specifically, an oscillator 1016, electronically connected to the power amplifier 1018, provides a driving signal for the power amplifier 1018. The output of the power amplifier 1018 is electronically communicated to the primary or driver coil 1022 contained in the electrodynamic core 1019; and thereby drives the driver coil 1022. Electric current in the driver coil creates movement of the driver coil 1022 and the sensing coil 1021 in a magnetic field due to magnet 1020 in accordance with the well-known Lens law.

The sensing coil 1021 moves in the same magnetic field as the driver coil 1022, measures the displacement of the bellows 1027 and communicates this displacement to the signal amplifier 1030.

The output from the signal amplifier 1030 is electronically channelled back into the input channel of the signal amplifier 1030, and is electronically fedback into the power amplifier 1018. The above channelled output proceeds through a damping network and signal conditioner 1032. The above feedback proceeds through an alternating current to direct current converter 1034.

The act of feeding back output from the signal amplifier 1030 into the power amplifier 1018 produces a relatively constant volumetric displacement of the bellows 1027. In particular, any changed displacement of the bellows 1027 is automatically measured by the sensing coil 1021 and communicated to the signal amplifier 1030, thereby producing a change in the output of the signal amplifier 1030. This change is in turn fedback into the power amplifier and activates a gain control 1036 such that the output from the power amplifier can be adjusted so as to maintain the relatively constant volumetric displacement of the bellows 1027.

Figure 7:
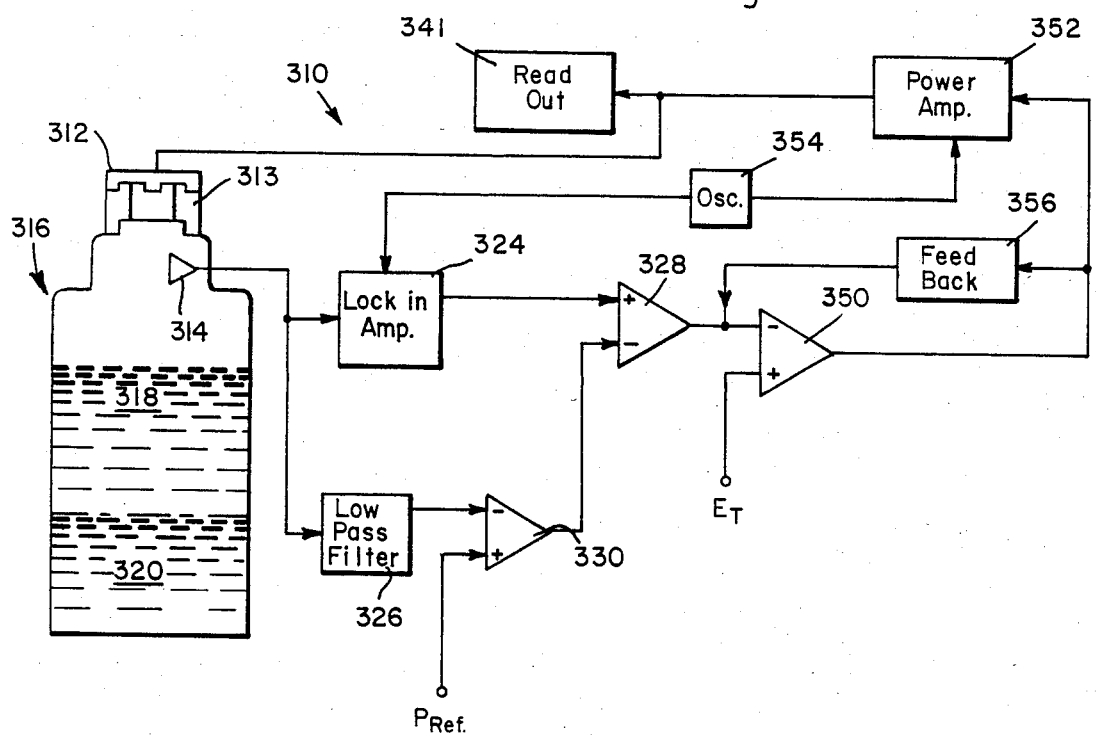
FIG. 7, is a diagrammatic illustration of still another embodiment of the invention having an electrodynamic driver.

FIG. 7 is another embodiment 310 of the invention providing improved resolution and accuracy. One of the results of this system is to provide a means whereby at any given ullage volume dynamic fluid pressure output equals reference pressure output. This is accomplished by means of feedback systems 356.

Enclosure 316 has an ullage volume 318 and a liquid volume 320 as in the previous embodiments. A transducer 314 is disposed so as to pick up dynamic fluid pressure changes in the ullage volume 318. The output of the transducer 314 is communicated to a lock-in amplifier 324 and to a low pass filter 326 as in the previous embodiments. The lock-in amplifier has an output which is communicated to a differential amplifier 328. The output of the low pass filter 326 is fed into differential amplifier 330. The other input of the differential amplifier 330 receives static pressure variation measurements from transducer 314 as in the other embodiments. The output of differential amplifier 330 is communicated to the other input terminal of differential amplifier 328. The output of differential amplifier 328 is fed into differential amplifier 350. The other input terminal of differential amplifier 350 receives a desired reference signal representing the total volume of the enclosure 316 or the pressure change in a fuel enclosure 316. The output of the differential amplifier 350 is communicated to a power amplifier 352 and also back into the pressure signal side of the differential amplifier 350. An oscillator 354 is connected to the lock-in amplifier 324 and amplifier 352 and serves as a driving signal for the power amplifier 352 and reference signal for the lock-in amplifier 324. The output of the power amplifier 352 is directed both to a suitable readout indicator 341 and to the driver 312. The output of the power amplifier 352 thereby drives the acoustics source and tends to equalize the pressure output from the lock-in amplifier 324 to the reference pressure.

Figure 8:
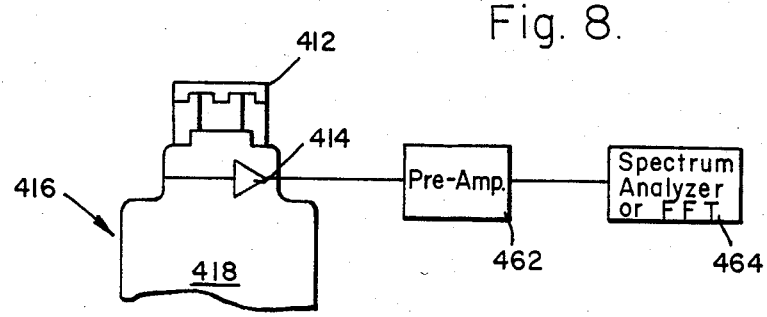
FIG. 8 is a diagrammatic illustration of another embodiment of the invention used for detection of leakage from an enclosed space and having one of the acoustical drivers depicted in FIG. 6.

FIG. 8 shows another embodiment 410 of the invention which is designed to measure leakage from an enclosed space. In this embodiment of the invention the enclosure 416 does not have to be rigid as in the other embodiments. This leakage detection system 410 is applicable particularly in the case of a spacecraft, space station, or astronaut suit. A constant volume sinusoidal driver 412 provides a constant volume displacement at a specified frequency. A pressure transducer 414 detects the change in pressure within the enclosed volume. Whenever there is a leakage in the enclosed volume, the amplitude of the acoustic signal is reduced and there is a distortion in the sinusoidal acoustic pressure wave shape. In this embodiment, the output of transducer 414 is communicated to a preamplifier 462 which is then fed into a spectrum analyzer or fast fourier transform machine 464. Theoretically, the system can detect even very small leaks in a very large enclosed space.

It can also readily be seen that compliance (for example, of a lung) can be measured using the applications of the principles described hereinabove. The compliance of air enclosed in a lung cavity of 10 liter capacity is:

$$\frac{\Delta V}{\Delta P} = \frac{V_o}{P_o \gamma}$$

where $\gamma = 1.41$; $V_o = 10$ liters; and $P_o = 14.7$ psi.

It is to be understood that the above described embodiments are merely illustrative of some of the many specific embodiments which represents applications of the principles of the present invention. Clearly, numerous and varied other arrangements may readily be devised by those skilled in the art, without departing from the spirit and scope of the invention.

I claim:

1. An apparatus for measuring the volume of an incompressible material in an enclosed space, comprising: a fluid;
   means for containing said fluid and the material to be measured, said means being substantially sealed in order to prevent the escape of the material and the fluid therefrom;
   means for emitting sound into said fluid thereby inducing dynamic fluid pressure change in the fluid;
   means for measuring the dynamic pressure change in the fluid caused by said means for emitting sound;
   means for measuring a static pressure change in the fluid;
   first means for comparing the measurement of the static fluid pressure change to a desired reference pressure measurement, said first means communicatingly connected to the means for measuring the static fluid pressure change and to the desired reference pressure measurement;
   second means for comparing the measurement of the dynamic fluid pressure change to the comparison of the static fluid pressure change to the desired reference pressure, said second means communicatingly connected to said first means for comparing and to said means for measuring the dynamic fluid pressure;
   means for linearizing the relationship between the dynamic fluid pressure change and the volume of the material;
   and means for converting the linear relationship between the fluid pressure and the volume into an indication of the volume of the substantially incompressible material in said means for containing the material to be measured.

2. An apparatus as in claim 1 wherein said means for measuring the dynamic fluid pressure changes caused by said means for emitting sound in said means for containing said fluid and the material to be measured comprises a transducer.

3. An apparatus as in claim 1 wherein said means for measuring the static fluid pressure change in said means for containing said fluid and the material to be measured comprises a transducer.

4. An apparatus as in claim 1 wherein said means for measuring the dynamic fluid pressure change and said means for measuring the static fluid pressure change comprises a single transducer positioned in the said means for containing said fluid and the material to be measured.

5. An apparatus as in claim 1 wherein said first means for comparing the measurement of the static fluid pressure change comprises a differential amplifier.

6. An apparatus as in claim 1 wherein said second means for comparing the measurement of the dynamic fluid pressure change comprises a differential amplifier.

7. An apparatus as in claim 1 wherein said means for linearizing includes an acoustic resistor positioned between said means for measuring the dynamic fluid pressure change and said means for containing said fluid the material to be measured, said acoustic resistor providing a passageway for fluid between said means for measuring the dynamic fluid pressure change and the exterior of said means for containing said fluid and the material to be measured.

8. An apparatus as in claim 1 wherein said means for linearizing includes a nonlinear circuit element electrically connected to the output of said differential amplifier in order to linearize output of said the differential amplifier relative to the dynamic fluid pressure changes.

9. An apparatus as in claim 1 further including an amplifier means amplifying an electrical output from said means for measuring the dynamic fluid pressure change, said amplifier means selectively amplifying the output within a desired frequency bandwidth.

10. An apparatus as in claim 1 further including a divider receiving an electrical output from said means for measuring dynamic fluid pressure and an electrical output from said means for measuring static fluid pressure for expressing the dynamic fluid pressure change and the static fluid pressure change as a ratio.

11. An apparatus as in claim 1 wherein said means for emitting sound operates at a subsonic frequency in order to reduce the value of the specific heat of the fluid.

12. An apparatus as in claim 1 wherein the means for emitting sound into said fluid thereby inducing dynamic fluid pressure change in the fluid comprises:

means for actuating piston means to impart acoustic vibrations to said fluid, including a motor driven cam which activates said piston means;

piston means each situated within a reference cavity and biased by biasing means, including a pair of substantially diametrically opposed piston elements having substantially simultaneous axial outward and retractive movement actuated by said motor driven cam and capable of substantially harmonic vibration, and a pair of substantially diametrically opposed spring elements each of which bases its corresponding piston elements;

means for effectuating substantially simultaneous axial outward and retractive movement and substantially harmonic vibration of said piston means and for reducing undesired noise and vibration caused by the actuation of said piston means by said means for actuating said piston means, including said pair of spring elements which facilitate the aforementioned movement and vibration, and a pair of substantially dametrically opposed cam lobes positioned at opposite ends of said motor driven cam which facilitate the aforementioned movement and vibration and reduce the aforementioned undesirable noise and vibration; and, pressure switching means for equalizing pressure and specific heat ratios within each reference cavity.

13. An apparatus as in claim 1 wherein the means for emitting sound comprises;

means for actuating bellows means to impart acoustical vibrations to a fluid, including a motor driven cam which actuates said bellows means;

bellows means each situated within a reference cavity and biased and balanced by biasing and balancing means, including a pair of substantially diametrically opposed bellows elements having substantially simultaneous axial outward and retractive movement actuated by said motor cam, and a pair of springs substantially parallel to one another which bias said pair of bellows elements and facilitate substantially simultaneous axial outward and retractive movement of said pair of bellows elements; and pressure switching means for equalizing pressure and specific heat ratios within each reference cavity.

14. An apparatus as in claim 1 wherein the means for emitting sound comprises:

means for actuating bellows means to impart acoustic vibrations to said fluid, including a pneumatic device which actuates said bellows means by transferring high pressure fluid into said bellows means;

bellows means each situated within a reference cavity and including a pair of substantially diametrically opposed bellows elements having substantially simultaneous axial outward and retractive movement; and, pressure switching means for equalizing pressure and specific heat ratio within each reference cavity.

15. An apparatus as in claim 1 wherein the means for emitting sound comprises:

means for actuating diaphragm means to impart acoustic vibrations into said fluid, including a pneumatic device which actuates said diaphragm means; and diaphragm means biased by biasing means, including a diaphragm element and a spring element which biases said diaphragm and facilitates substantially uniform expansion and contraction of said diaphragm.

16. An apparatus as in claim 1 wherein the means for emitting sound comprises:

means electronically connected to power amplifying means, including an oscillator electronically connected to and providing a driving signal to a power amplifier which electronically communicates its output to an electrodynamic driving means and acutates said electrodynamic driving means;

an electrodynamic driving means including first coil means which receives said signal from said power amplifier and moves along with a second coil means in a magnetic field due to magnetic means, and drives a bellows means;

signal amplifying means which receive input electronically communicated from said second coil means and from a damping and signal conditioning means to which has been electronically communicated output from said signal amplifying means;

feedback for electronically transmitting the output of said amplifying means and inputting this output into said power amplifying means, and including a means for converting the output of said signal amplifying means from alternating current to direct current; and means to response to changes in the output from the signal amplifying means feedback to said feedback means, including a gain control element.

17. An apparatus for detecting a fluid leakage in an enclosed space, comprising:

a means for containing the fluid;

a means for emitting sound into said means for containing the fluid;

a means for measuring pressure change of the fluid, said means having an output including the measurement;

an amplifier means;

a means for communicating the measurement of the pressure change to said amplifier means, an indicator means for indicating the amplitude and phase of the pressure changes of said fluid, and a means for communicating the output of said amplifier means to said indicator means.

18. An apparatus as in claim 17 wherein said amplifier means comprises a preamplifier.

19. An apparatus as in claim 17 wherein said indicator means comprises a spectrum analyzer.

20. An apparatus as in claim 17 wherein said indicator means comprises a fast fourier transform machine.

21. An apparatus as in claim 17 wherein the means for emitting sound into said fluid thereby inducing dynamic fluid pressure change in the fluid comprises:

means for actuating piston means to impart acoustic vibrations to said fluid including a motor driven cam which activates said piston means;

piston means, each situated within a reference cavity and biased by biasing means, including a pair of substantially diametrically opposed piston elements having substantially simultaneous axial outward and retractive movement actuated by said motor driven cam and capable of substantially harmonic vibration, and a pair of substantially diametrically opposed spring elements each of which biases its corresponding piston element;

means for effectuation substantially simultaneous axial outward and retractive movement and substantially harmonic vibration of said piston means and for reducing undesired noise and vibration caused by the actuation of said piston means by said means for actuating said piston means, including said pair of spring elements which facilitate the aforementioned movement and vibration, and a pair of substantially diametrically opposed cam lobes positioned at opposite ends of said motor driven cam which facilitate the aforementioned movement and vibration and reduce the aforementioned undersirable noise and vibration; and, pressure switching means for equalizing pressure and specific heat ratio within each reference cavity.

22. An apparatus as in claim 17 wherein the means for emitting sound comprises:

means for actuating bellows means to impart acoustical vibrations to said fluid, including a motor driven cam which actuates said bellows means, bellows means each situated within a reference cavity and biased and balanced by biasing and balancing means, including a pair of substantially diametrically opposed bellows elements having substantially simultaneous axial outward and retractive movement actuated by said motor driven cam, and a pair of springs substantially parallel to one another which bias said pair of bellows elements and facilitate substantially simultaneous axial outward and retractive movement of said pair of bellows elements; and pressure switching means for equalizing pressure and specific heat ratios within each reference cavity.

23. An apparatus as in claim 17 wherein the means for emitting sound comprises:

means for actuating bellows means to impart acoustic vibrations to said fluid, including a pneumatic device which actuates said bellows means by transferring hot pressure fluid into said bellows means;

bellows means including a pair of substantially diametrically opposed bellows elements having substantially simultaneous axial outward and retractive movement; and pressure switching means for equalizing pressure and specific heat ratios within each reference cavity.

24. An apparatus as in claim 17 wherein the means for emitting sound comprises:

means for actuating diaphragm means to impart acoustic vibrations into said fluid, including a pneumatic device which actuates said diaphragm means; and diaphragm means biased by biasing means, including a diaphragm element and a spring element which biases said diaphragm and facilitates substantially uniform expansion and contraction of said diaphragm.

25. An apparatus as in claim 17 wherein the means for emitting sound comprises:

means electronically connected to power amplifying means, including an oscillator electronically connected to and providing a driving signal to a power amplifier which electronically communicates its output to an electrodynamic driving means and actuates said electrodynamic driving means;

an electrodynamic driving means including first coil means which receive said signal from said power amplifier and moves along with a second coil means in a magnetic field due to a magnetic means and drives a bellows means;

signal amplifying means which receive input electronically communicated from said second coil means and from a damping and signal conditioning means to which has been electronically communicated output from said signal amplifying means;

feedback means for electronically transmitting the output of said amplifying means and inputting this output into said power amplifying means, and including a means for converting the output of said signal amplifying means from alternating current to direct current; and means in response to changes in the output from the signal amplifying means feedback to said feedback means, including a gain control element.

26. An apparatus for acoustically measuring the volume of a material within an enclosed space, comprising:

a fluid;

means for containing said fluid and the material is to be measured;

means for emitting sound into said fluid thereby inducing a fluid pressure change in said fluid;

a pickup transducer for measuring the pressure change caused in the fluid by said means for emitting sound;

a lock-in amplifier electrically connected to said transducer for measuring the pressure changes in the fluid produced by said means for emitting sound, said lock-in amplifier measuring only the pressure changes within a desired bandwidth corresponding to the approximate frequency of operation of said means for emitting sound;

a low pass filter electrically connected to said transducer, said low pass filter transmitting frequencies of pressure change in the fluid below a certain value corresponding approximately to a static fluid pressure change in said means for containing said fluid and the material to be measured;

a first differential amplifier electrically connected to said lock in amplifier;

a second differential amplifier electrically connected to said low pass filter and to said first differential amplifier so that a comparison is thereby made between static fluid pressure changes and dynamic fluid pressure changes in said means for containing said fluid and the material to be measured;

a third differential amplifier electrically connected to said first differential amplifier;

means for transmitting the desired reference signal to said third differential amplifier;

feedback means for transmitting the output of said third differential amplifier back into the input of said third differential amplifier for improving the output of said differential amplifier measuring the difference between the reference output and the output from said first and said second differential amplifiers;

power amplifier electrically connected to said third differential amplifier and connected to said driver in order to operate said means for emitting sound at a desired frequency; and means for indicating the output of said power amplifier in terms of the volume of the material to be measured.

* * * * *